United States Patent [19]
Fujinawa et al.

[11] 4,051,417
[45] Sept. 27, 1977

[54] CONTROL SYSTEM FOR A BRUSHLESS MOTOR

[75] Inventors: Masaaki Fujinawa, Hachioji; Kiyoo Takeyasu, Tokorozawa; Kenichi Iizuka, Shimotsuga; Motokazu Uchida, Setagaya; Hideo Uzuhashi, Shimotsuga, all of Japan

[73] Assignee: Hitachi, Ltd., Japan

[21] Appl. No.: 610,289

[22] Filed: Sept. 4, 1975

[30] Foreign Application Priority Data

Sept. 4, 1974  Japan .................................. 49-100903

[51] Int. Cl.² ............................................. H02K 29/00
[52] U.S. Cl. ...................................... 318/138; 318/341
[58] Field of Search ................. 318/138, 254, 341, 439

[56] References Cited

U.S. PATENT DOCUMENTS

| | | | |
|---|---|---|---|
| 3,639,818 | 2/1972 | Wiart | 318/138 |
| 3,678,358 | 7/1972 | Kolatorowicz | 318/138 X |
| 3,688,169 | 8/1972 | Yamaya et al. | 318/138 |
| 3,746,941 | 7/1973 | Ageev et al. | 318/138 |

Primary Examiner—Gene Z. Rubinson
Attorney, Agent, or Firm—Craig & Antonelli

[57] ABSTRACT

In a control system for a brushless motor comprising a power source, a plurality of driving coils and contactless switching elements for intermittently supplying voltage across the power source to the driving coils in response to rotor position signals, rotor position signals are chopped by a chopping signal in which a ratio of a high level period to a low level period can be changed, and a portion of the contactless switching elements is driven by the chopped rotor position signals, thereby controlling the rotating speed of the brushless motor.

6 Claims, 7 Drawing Figures

400 4,051,417

CONTROL SYSTEM FOR A BRUSHLESS MOTOR

BACKGROUND OF THE INVENTION

The present invention relates to a system for controlling a brushless motor in which a current intermittently flows in each of the driving coils in response to the conductive condition of the corresponding contactless switching element such as a semiconductor switching element.

In general, a brushless motor has a plurality of driving coils and contactless switching elements and continues to rotate by an intermittent current flowing in each of the driving coils in response to the operation of the corresponding switching element driven by a rotor position signal.

As a system for controlling the speed of such a motor, there is well known a system having a chopping transistor, an inductor and a diode for current-feedback (flywheel diode). In such a system, the voltage across the power source is applied at a certain period to the driving coils through the switching elements in response to the conductive condition of the chopping transistor.

The rotating speed of the motor is controlled by changing the ratio of the conducting period of the chopping transistor to the nonconducting period thereof so as to change the average voltage applied to the driving coils of the motor.

However, such a prior art control system requires the chopping transistor for high power, an inductor and a diode for current feedback. Therefore, this system is complicated and is expensive.

SUMMARY OF THE INVENTION

An object of the present invention is to provide a simple and inexpensive system for controlling a brushless motor.

In order to attain such an object, the present invention is characterized by an arrangement periodically chopping the voltage across a power source by means of the contactless switching elements for currents flowing intermittently to the driving coils, without using a chopping transistor, an inductor and a diode for current feedback.

This and other objects, features and advantages of the present invention will become more apparent from the following description when taken in connection with the accompanying drawings which show, for purposes of illustration only, several embodiments in accordance with the present invention.

DETAILED DESCRIPTION

Figure 1:
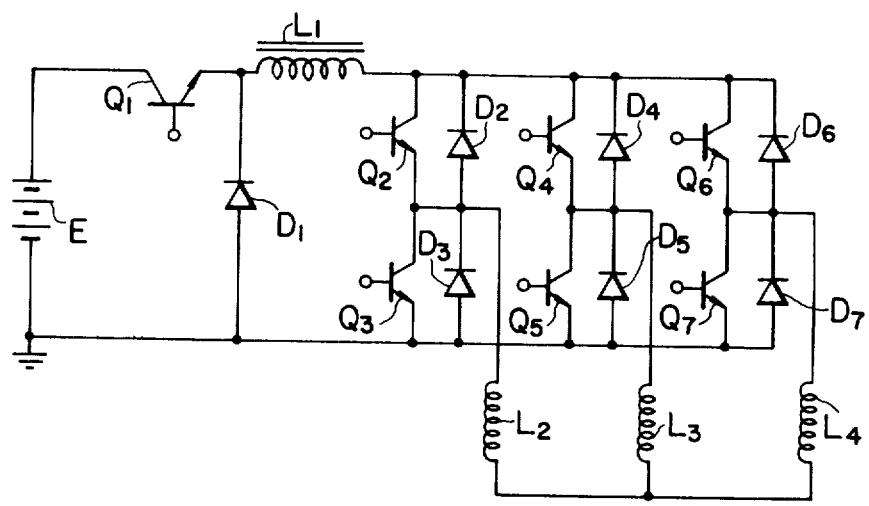
FIG. 1 is a circuit diagram showing a prior art control system for a brushless motor.

A prior art control system for a brushless motor is shown in FIG. 1.

In FIG. 1, symbol E represents a DC power source, symbol $Q_1$ a chopping transistor, symbol $L_1$ an inductor, symbol $D_1$ a diode for current feedback, symbols $Q_2$ to $Q_7$ transistors for commutator function, symbols $L_2$ to $L_4$ driving coils, and symbols $D_2$ to $D_7$ diodes for suppressing spike voltage.

The voltage across the DC power source E is chopped at a certain frequency by the chopping transistor $Q_1$.

The rotating speed of the motor is controlled by changing the ratio of conducting period of the chopping transistor $Q_1$ to the nonconducting period thereof, so as to change the average voltage applied to the driving coils $L_2$.

The transistors $Q_2$ to $Q_7$ are turned ON or OFF in response to rotating position signals from a rotating position detector (not shown).

In a first mode of operation, transistors $Q_2$ and $Q_5$ are rendered conductive and the remaining transistors $Q_3$, $Q_4$, $Q_6$ and $Q_7$ are rendered nonconductive.

Therefore, current from the DC power source E flows through the chopping transistor $Q_1$, the inductor $L_1$ and transistor $Q_2$ and $Q_5$ to driving coils $L_2$ and $L_3$.

In a second mode of operation, transistor $Q_2$ is turned OFF and transistor $Q_6$ is turned ON. When transistor $Q_2$ is turned OFF, negative spike voltage is applied to the emitter of transistor $Q_2$ by inductance of driving coil $L_2$. Since diode $D_3$ is rendered conductive, this spike voltage cannot become less than ground voltage.

When transistor $Q_6$ is turned ON, current from the DC power source E flows through transistors $Q_5$ and $Q_6$ etc. to driving coil $L_3$ and $L_4$.

In a third mode of operation, transistor $Q_5$ is turned OFF and transistor $Q_3$ is turned ON. When transistor $Q_5$ is turned OFF, a positive spike voltage is applied to the collector of transistor $Q_5$ by the inductance of driving coil $L_3$.

However, this spike voltage never becomes more than the voltage across the DC power source E, since diode $D_4$ is rendered conductive when the spike voltage begins to become more than the voltage across the power source E.

When transistor $Q_3$ is turned ON, a current from the power source E flows through transistors $Q_3$ and $Q_6$, etc. to driving coils $L_2$ and $L_4$.

In a similar manner, current flows through transistors $Q_3$ and $Q_4$, etc. to driving coils $L_2$ and $L_3$ in a fourth mode of operation, and a current flows through transistors $Q_4$ and $Q_7$, etc. to driving coils $L_3$ and $L_4$ in a fifth mode of operation. In the sixth mode, current flows through transistors $Q_2$ and $Q_7$, etc. to driving coils $L_2$ and $L_4$.

Since these modes are repeated, the brushless motor continues to rotate.

However, in order to change the rotating speed of the motor, it is necessary to provide the chopping transistor $Q_1$, the inductor $L_1$ and the diode $D_1$ for current feedback. Therefore, the prior art system is complicated and is expensive.

Figure 2:
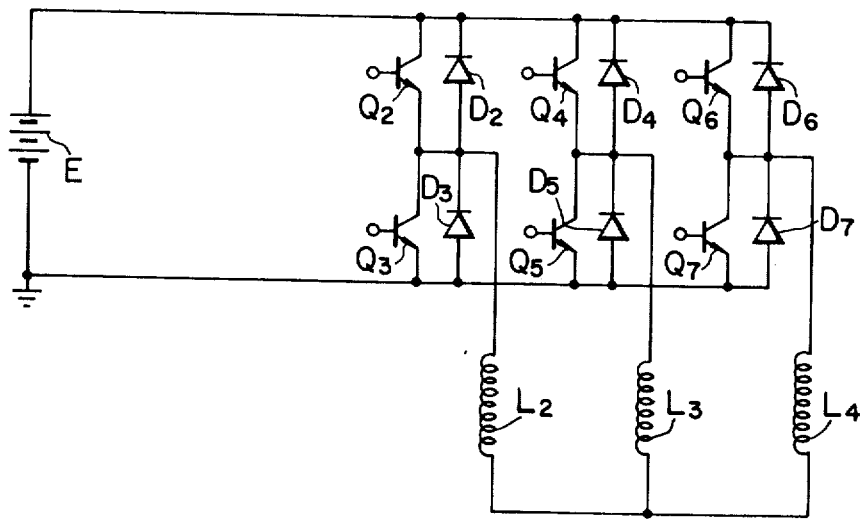
FIG. 2 is a circuit diagram showing an embodiment of a control system for a brushless motor according to the present invention.

FIG. 2 shows an embodiment of a control system according to the present invention.

In FIG. 2, the emitters of transistors $Q_2$, $Q_4$ and $Q_6$ are connected to the collectors of transistors $Q_3$, $Q_5$ and $Q_7$, respectively. The collectors of transistors $Q_2$, $Q_4$ and $Q_6$ are connected in common to the positive polarity terminal of the power source E and the emitters of transistors $Q_3$, $Q_5$ and $Q_7$ are connected in common to the negative polarity terminal thereof and are connected to ground. The emitters of transistors $Q_2$, $Q_4$ and $Q_6$ are connected to one of the terminals of the driving coils $L_2$, $L_3$ and $L_4$, respectively, the other terminals thereof being connected in common.

Furthermore, diodes $D_2$ to $D_7$ are connected between the emitters and the collectors of transistors $Q_2$ to $Q_7$, respectively, in such a manner that the collectors and the emitters of transistors $Q_2$ to $Q_7$ are connected to the cathodes and the anodes of diodes $D_2$ to $D_7$, respectively.

In the circuit of FIG. 2, the chopping transistor $Q_1$, the inductor $L_1$ and the diode $D_1$ for current feedback shown in FIG. 1 are eliminated.

Chopping for changing the rotating speed of the motor is performed by transistors $Q_2$ to $Q_7$.

Therefore, transistors $Q_2$ to $Q_7$ have a commutator function and a chopping function.

In a first mode of operation, transistors $Q_2$ and $Q_5$ are rendered conductive for exciting driving coils $L_2$ and $L_3$, as described above. Transistor $Q_5$ is then intermittently rendered conductive at a certain period for chopping.

The values of currents flowing in driving coils $L_2$ and $L_3$ shown in FIG. 2 are substantially equal to those of currents obtained by the circuit of FIG. 1. The current flowing in driving coils $L_2$ and $L_3$ is smoothed by the inductance of driving coils $L_2$ and $L_3$.

A current flows through transistors $Q_2$ and $Q_5$ to driving coils $L_2$ and $L_3$ when transistor $Q_5$ is turned ON, while a current flows through transistor $Q_2$ and diode $D_4$ to driving coils $L_2$ and $L_3$ when transistor $Q_5$ is turned OFF.

Therefore, the rotating speed of the motor is controlled by changing a ratio of the conducting period of transistor $Q_5$ to the nonconducting period thereof.

In a similar manner, second to sixth modes of operation are performed in succession.

Figure 3:
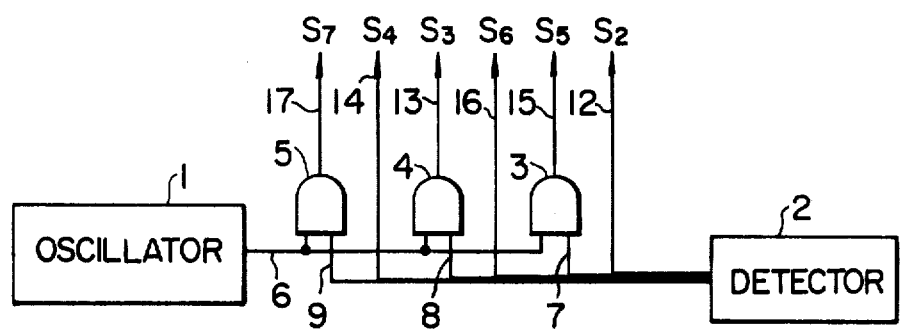
FIG. 3 is a circuit diagram showing an embodiment of a circuit for driving transistors for commutator function and chopping function as shown in FIG. 2.

FIG. 3 shows an embodiment of a circuit for driving transistors $Q_2$ and $Q_7$ in the circuit of FIG. 2.

In FIG. 3, numeral 1 representation oscillator for generating a chopping signal, numeral 2 is a rotor position detector, numerals 3 to 5 are AND circuits, and numerals 6 to 9 and 12 to 17 are signal lines.

Figure 4:
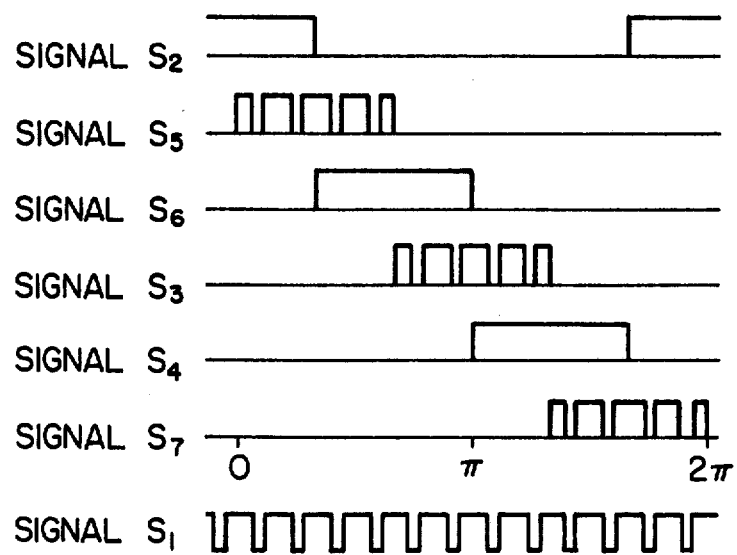
FIG. 4 is a timing diagram of signals at the respective portions of the circuit shown in FIG. 3.

FIG. 4 shows a timing diagram of signals $S_1$ to $S_7$ in FIG. 3.

In FIG. 3, the oscillator 1 generates a chopping pulse signal, pulse width of which can be changed.

The rotor position detector 2 generates different position signals successively shifted in phase by $\pi/3$ and having pulse width 2 $\pi/3$. These position signals are generated by detecting indicators attached to the rotor of the motor and are transferred to signal lines 12, 7, 16, 8, 14 and 9. Signal lines 7, 8 and 9 are connected to the one input terminal of the AND circuits 3, 4 and 5, respectively. Signal line 6 from the oscillator 1 is connected to the other input terminal of the AND circuits 3, 4, and 5.

Furthermore, the output terminals of the AND circuits 3, 4 and 5 are connected to signal lines 15, 13 and 17, respectively. Signals $S_2$ to $S_7$ in signal lines 12 to 17 are applied to the bases of transistors $Q_2$ to $Q_7$ shown in FIG. 2, respectively.

In short, position signals in signal lines 12, 16 and 14 directly are applied as driving signals, $S_2$, $S_6$ and $S_4$ to transistors $Q_2$, $Q_6$ and $Q_4$, respectively. On the other hand, position signals in signal lines 7, 8 and 9 are applied as driving signals $S_5$, $S_3$ and $S_7$ through the AND circuits 3, 4 and 5 to transistors $Q_5$, $Q_3$ and $Q_7$, respectively. In the AND circuits 3, 4 and 5, position signals in signal lines 7, 8 and 9 are chopped by the chopping signal from the oscillator 1.

Chopped signals are applied as driving signals to transistors $Q_5$, $Q_3$ and $Q_7$. These driving signals $S_2$ to $S_7$ have wave forms such as shown in FIG. 4. When a driving signal is at high level, the corresponding transistor is rendered conductive.

Therefore, the rotating speed of the motor is controlled by changing a ratio of the period of the high level of the chopping signal to the period of the low level thereof. Although chopping operation is executed by transistors $Q_3$, $Q_5$ and $Q_7$ in the embodiment of FIGS. 2 and 3, it can be executed by transistors $Q_2$, $Q_4$ and $Q_7$.

In such a case, signal lines 12, 16 and 14 are connected to $Q_2$, $Q_6$ and $Q_4$, through AND circuits in which position signals are chopped by the chopping signal, and signal lines 7, 8 and 9 directly are connected to transistors $Q_5$, $Q_3$ and $Q_7$.

Figure 5:
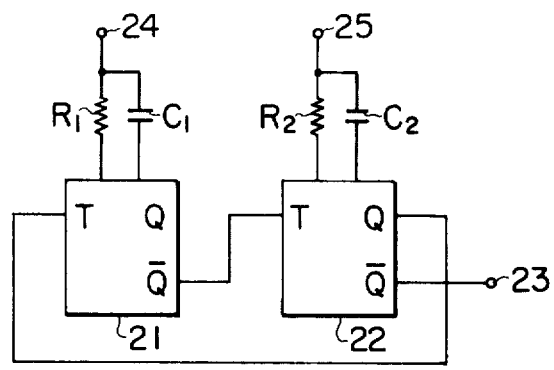
FIG. 5 is a circuit diagram showing an example of concrete construction of a portion of the circuit shown in FIG. 3.

FIG. 5 shows an example of the oscillator 1 shown in FIG. 3.

In FIG. 5, numerals 21 and 22 represent monostable multivibrators, numeral 23 is an output terminal, numerals 24 and 25 are power supply terminals, $R_1$ and $R_2$ are resistors, and $C_1$ and $C_2$ are capacitors.

The output terminal $\overline{Q}$ of monostable multivibrator 21 is connected to the input terminal T of monostable multivibrator 22. The output terminal $\overline{Q}$ of multivibrator 22 is connected to the input terminal T of multivibrator 21. The output terminal Q of multivibrator 22 is connected to the output terminal 23. Resistor $R_1$ and capacitor $C_1$ are connected to multivibrator 21 and resistor $R_2$ and capacitor $C_2$ are connected to multivibrator 22 and constitute respective time constant circuits.

Therefore, the ratio of the period of the high level of the chopping signal to the period of the low level thereof, that is, the duty cycle can be changed by changing the values of resistors $R_1$ and $R_2$ or capacitors $C_1$ and $C_2$.

Figure 6:
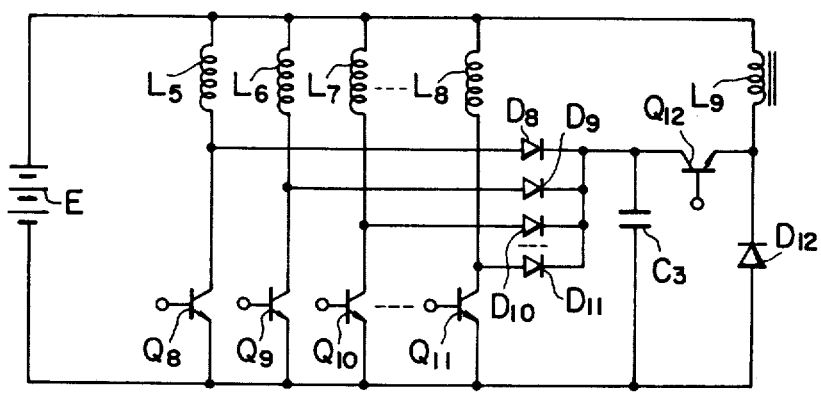
FIG. 6 is a circuit diagram showing another embodiment of a control system for a brushless motor according to the present invention.

FIG. 6 shows another embodiment of a control system according to the present invention.

In FIG. 6, symbols $Q_8$ to $Q_{11}$ represent transistors for a commutator function and for a chopping function, symbols $L_5$ to $L_8$ are driving coils, symbols $D_8$ to $D_{12}$ are diodes, symbol $C_3$ is a capacitor, symbol $L_9$ is an inductor, and symbol $Q_{12}$ is a transistor for feedback.

The collectors of transistors $Q_8$ to $Q_{11}$ are connected to one of the terminals of inductors $L_5$ to $L_8$, respectively. The other terminals of inductors $L_5$ to $L_8$ and the emitters of transistors $Q_8$ to $Q_{11}$ are connected in common to the positive and negative polarity terminals of the DC power source E, respectively. The collectors of transistors $Q_8$ to $Q_{11}$ are connected to the anodes of diodes $D_8$ to $D_{11}$, respectively. The cathodes of diodes $D_8$ to $D_{11}$ are connected in common to the one terminal of capacitor $C_3$ and the collector of transistor $Q_{12}$. The other terminal of capacitor $C_3$ is connected to the negative polarity terminal of the power source E. The emitter of transistor $Q_{12}$ is connected to the one terminal of inductor $L_9$ and the cathode of diode $D_{12}$.

Furthermore, the other terminal of inductor $L_9$ and the anode of diode $D_{12}$ are connected to the positive and negative polarity terminals of the power source E, respectively.

With such a circuit configuration, chopped driving signals are applied to the bases of transistors $Q_8$ to $Q_{11}$.

When transistors $Q_8$ to $Q_{11}$ are turned OFF, a spike voltage is applied to the collectors of transistors $Q_8$ to $Q_{11}$. A circuit for absorbing the spike voltage is constituted by the circuit including capacitor $C_3$, diodes $D_8$ to $D_{12}$, transistor $Q_{12}$ and inductor $L_9$.

In the absorbing circuit, the energy of the spike voltage is stored through diodes $D_8$ to $D_{11}$ in capacitor $C_3$. The energy charged in capacitor $C_3$ is effectively fed back through transistor $Q_{12}$, diode $D_{12}$ and inductor $L_9$ to the power source E by rendering transistor $Q_{12}$ conductive.

It is desirable to maintain the voltage across capacitor $C_3$ constant for lowering the level of the spike voltage less than predetermined value and for suppressing an energy loss caused by charging or discharging of capacitor $C_3$.

In order to hold the voltage across capacitor $C_3$ constant, the quality discharged from capacitor $C_3$ is fundamentally equalized to the quality charged in capacitor $C_3$. This condition is substantially satisfied by intermittently rendering transistor $Q_{12}$ conductive for a predetermined period.

Figure 7:
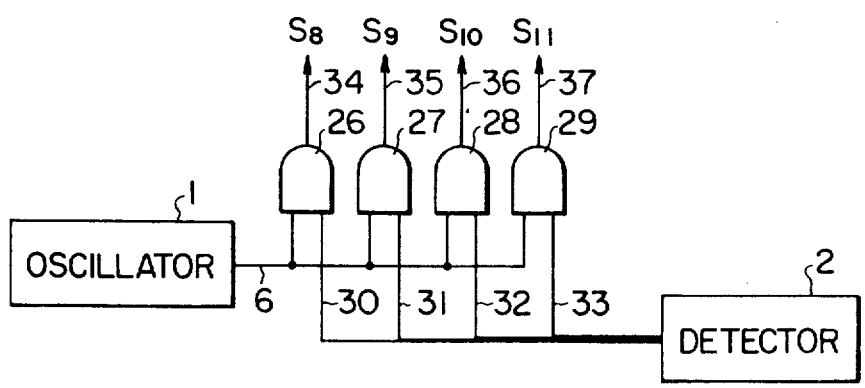
FIG. 7 is a circuit diagram of an embodiment of a circuit for driving transistors for commutator function and chopping function shown in FIG. 6.

FIG. 7 shows an embodiment of a circuit for driving transistors $Q_8$ to $Q_{11}$ shown in FIG. 6.

In FIG. 7, numerals 26 to 29 represent AND circuits and numerals 30 to 37 represent signal lines.

The position signals from the rotating position detector 2 are applied through signal lines 30 to 33 to one of the input terminals of the AND circuits 26 to 29, respectively. The chopping signal from the oscillator 1 is applied through signal line 6 to the other input terminals of the AND circuits 26 to 29. Driving signals $S_8$ to $S_{11}$ are applied through signal lines 34 to 37 to transistors $Q_8$ to $Q_{11}$ shown in FIG. 6.

With such a circuit configuration, all the position signals from the detector 2 are chopped by the chopping signal.

Since the driving coils $L_5$ to $L_8$ are inductors, the inductor $L_9$ can be eliminated.

The spike voltage absorbing circuit is not limited to the embodiments such as those described above and can be constituted by other various elements.

Furthermore, it is possible to substitute an AC power source for the DC power source and to substitute a thyristor for each of transistors $Q_2$ to $Q_{12}$.

The construction of the motor, the phase number thereof, the pole number thereof, etc. are not limited in the above-mentioned embodiments.

According to the present invention a circuit including the chopping transistor $Q_1$, the inductor $L_1$ and the diode $D_1$ such as shown in FIG. 1 can be eliminated. Therefore, the control system according to the present invention is constituted by a simple and inexpensive circuit.

What is claimed is:

1. A control system for a brushless motor comprising:
a power source;
a plurality of driving coils inductively coupled with a rotor of said motor, one terminal of each coil being connected in common;
detector means for detecting the rotor position of said rotor and generating rotor position signals corresponding to the position of said rotor;
an oscillator for generating a chopping signal;
a logic circuit, coupled to said detector means and said oscillator, for chopping a portion of said rotor position signals in response to the chopping signal from said oscillator;
a plurality of first semiconductor switching elements each having a first terminal connected to another terminal of each of said coils, respectively, a second terminal connected to one terminal of said power source, and a control terminal;
a plurality of second semiconductor switching elements each having a first terminal connected to another terminal of said power source, a second terminal connected to the first terminal of a respective one of said first semiconductor switching elements, and a control terminal;
a plurality of rectifying elements respectively connected across the first and second terminals of each of said first and second semiconductor switching elements, so as to be rendered conductive in a direction opposite to the conduction direction of said first and second semiconductor switching elements;
first means for applying the portion of the rotor position signals chopped by said logic circuit to the control terminals of said first semiconductor switching elements; and
second means for directly applying a portion of the rotor position signals from said detector means to the control terminals of said second semiconductor switching elements.

2. A control system according to claim 1, wherein each of said semiconductor switching elements comprises a transistor.

3. A control system according to claim 1, wherein each of said rectifying elements comprises a diode.

4. A control system for a brushless motor comprising:
a power source;
a plurality of driving coils inductively coupled with a rotor of said motor, one terminal of each coil being connected in common to one terminal of said power source;
detector means for detecting the rotor position of said rotor and generating rotor position signals corresponding to the position of said rotor;
an oscillator for generating a chopping signal;
a logic circuit, coupled to said detector means and said oscillator, for chopping the rotor position signals from said detector means in response to the chopping signal from said oscillator;
a plurality of semiconductor switching elements each having a first terminal connected to another terminal of each of said driving coils, respectively, a second terminal connected to the other terminal of said power source, and a control terminal;
absorbing means, connected to said semiconductor switching elements, for absorbing spike voltages across said semiconductor switching elements comprising a plurality of rectifying elements, the anodes of which are connected to said another terminals of said driving coils, a capacitor, one terminal of which is connected to the cathode of said rectifying elements, and another terminal of which is connected to the other terminal of said power source, a further semiconductor switching element, having a first terminal connected to the one terminal of said capacitor, and a further rectifying element, the anode of which is connected to the other terminal of said power source and the cathode of which is connected to a second terminal of said further semiconductor switching element and the one terminal of said power source; and means for applying the rotor position signals, chopped by said logic circuit, to the control terminals of said semiconductor switching elements.

5. A control system for a brushless motor according to claim 4, wherein each of said semiconductor switching elements comprises a transistor.

6. A control system for a brushless motor according to claim 4, wherein said absorbing means further comprises an inductor connected between the one terminal of said power source and said second terminal of said further semiconductor switching element.

* * * * *